(12) United States Patent
Brittner

(10) Patent No.: US 6,594,105 B1
(45) Date of Patent: Jul. 15, 2003

(54) TIME OPTIMAL SEEKS USING LINEAR VELOCITY SCHEDULING

(75) Inventor: Rod Brittner, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/474,739

(22) Filed: Dec. 29, 1999

Related U.S. Application Data (60) Provisional application No. 60/130,317, filed on Apr. 21, 1999.

(51) Int. Cl.$^7$ ............................................. G11B 5/596
(52) U.S. Cl. ................................................ 360/78.06
(58) Field of Search ........................... 360/78.04, 78.07, 360/78.09, 78.06

(56) References Cited

U.S. PATENT DOCUMENTS

| | | | |
|---|---|---|---|
| 4,835,633 A | 5/1989 | Edel et al. | 360/78.12 |
| 4,939,600 A | 7/1990 | Desai et al. | 360/78.04 |
| 5,182,684 A | 1/1993 | Thomas et al. | 360/78.09 |
| 5,570,332 A | * 10/1996 | Heath et al. | 369/50 |
| 5,684,650 A | * 11/1997 | Kadlec et al. | 360/77.06 |
| 5,684,653 A | 11/1997 | Knowles | 360/78.04 |
| 5,949,608 A | 9/1999 | Hunter | 360/78.09 |

* cited by examiner

*Primary Examiner*—David Hudspeth
*Assistant Examiner*—Mitchell Slavitt
(74) *Attorney, Agent, or Firm*—Merchant & Gould P.C.

(57) ABSTRACT

A method and apparatus for optimizing seeks for a head on an actuator arm of a disc drive is disclosed. The method involves obtaining a distance to the target track and an optimum time to seek over the obtained distance for each velocity sampling point. The target velocity is then computed from the obtained distance and the optimum time and the actual velocity is subtracted to yield an error. The error is then utilized to provide a current to correct the acceleration of the servomechanism attached to the actuator arm. The apparatus includes a memory for storing acceleration and motor time constants; a microprocessor for calculating the obtained distance, the optimum time, the target velocity, the error, and the current value; a servomechanism that swings the actuator arm; a transducer that produces a position signal; and a power amplifier for receiving the current value and driving the servomechanism.

15 Claims, 7 Drawing Sheets

TIME OPTIMAL SEEKS USING LINEAR VELOCITY SCHEDULING

RELATED APPLICATIONS

This application claims the benefit of the filing date of U.S. Provisional Patent Application Ser. No. 60/130,317 filed Apr. 21, 1999 and entitled "TIME OPTIMAL SEEKS USING LINEAR VELOCITY SCHEDULING."

FIELD OF THE INVENTION

This application relates to hard disc drives and more particularly to an apparatus and method for optimizing seeks using linear velocity scheduling.

BACKGROUND OF THE INVENTION

In a disc drive data is recorded on a disc in concentric, circular paths known as tracks. During operation the disc continually rotates and a read/write head a given radius from the center of the disc would read or write data in a given track. An actuator arm swings the head in an arc across the disc surface to allow the head to read or write data in different tracks.

The read/write head is mounted upon the distal end of the actuator arm, and the arm is moved by a servo control system. Accordingly, the track position of the head is controlled by the servo system. When the head needs to access a different track, the actuator arm swings the head to the desired track location. The motion of the head from one track to another includes an acceleration and a deceleration phase, and the period during which head movement occurs is known as the seek time. For drive performance, it is desirable to minimize the seek time.

In a conventional disc drive, the movement of the actuator arm is controlled by feedforward and feedback control systems. The control process typically works as follows. A ROM (read only memory) look-up table possesses a velocity profile that indicates the target velocity of the head, given the head's distance from the desired track. Such a table assumes a nominal rate of deceleration. Typically, the table yields a target velocity for a given distance parameter based upon the relationship $v(x)=[2ax]_{1/2}$, where v represents the target velocity, a represents the worst case acceleration, and x represents the distance that the head must travel, along an arc centered about the arm's pivot point, to reach its desired track position. The table is necessary because computing the velocity in real time is too processor intensive since the calculation is not linear. The target velocity is typically limited to some maximum value, $v_{max}$.

Figure 8:
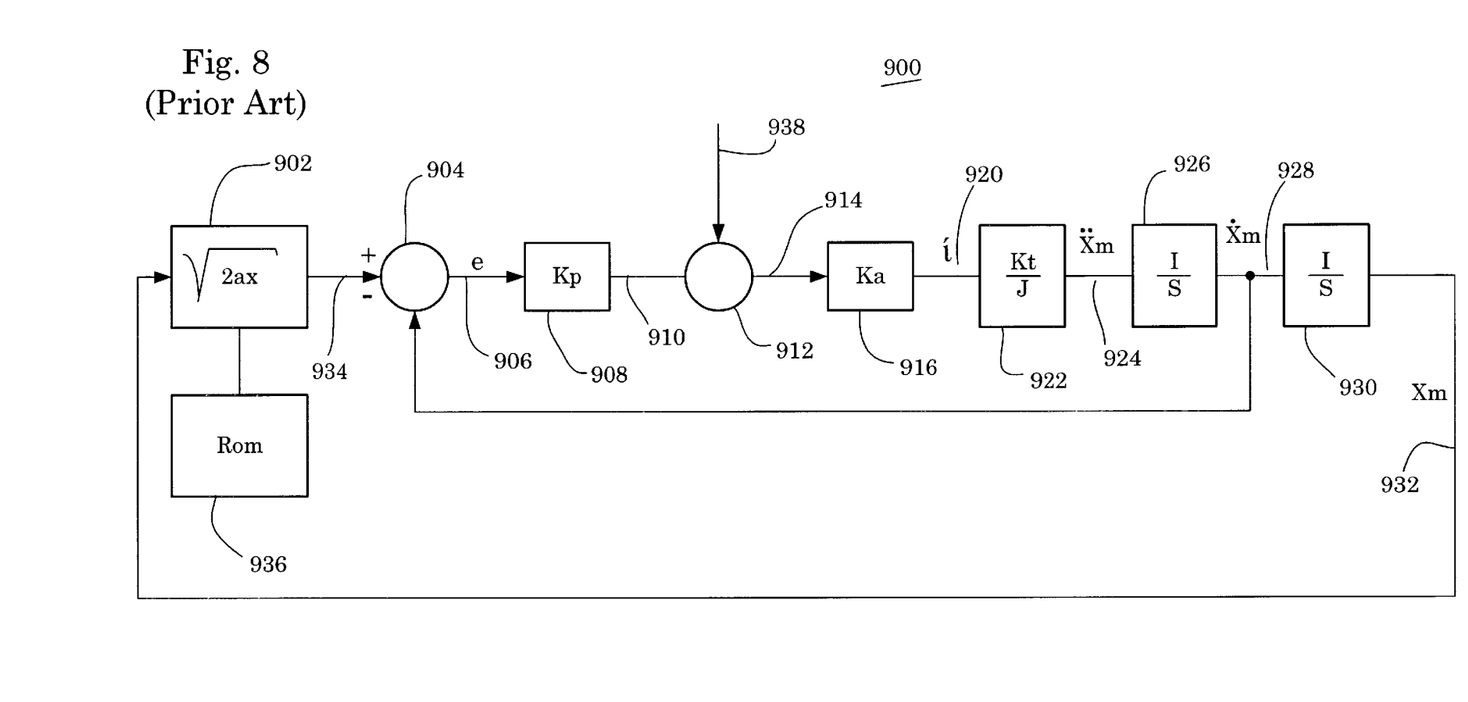
FIG. 8 illustrates a signal flow diagram of a prior art control system.

Referring to FIG. 8, a prior art control system 900 is illustrated. A target velocity process 902 produces a target velocity 934 by finding from the displacement signal 932 the distance remaining to the target track. This distance is looked-up in a velocity profile stored in ROM 936 to find the target velocity value 934. The velocity profile has been pre-determined according to the square root equation. The target velocity value 934 is fed to summation process 904 along with the actual velocity 928 that has been measured. The actual velocity is subtracted from the target velocity to produce an error quantity 906. The error quantity 906 is amplified by scaling process 908 to produce an error value 910. Summation process 912 combines the error value 910 with a feedforward signal 938 to produce an error current value 914. The error current value is amplified by scaling process 916 to produce a driving current 920. The driving current 920 is fed into the servomechanism where it is converted to acceleration 924 by conversion process 922. The acceleration 924 is converted to velocity 928 by integration process 926, and the velocity 928 is converted to displacement 932 by integration process 930.

When movement begins, the arm is accelerated with the maximum torque possible. At intervals, the control system 900 gathers information regarding the actual velocity 928 of the head, and the head's distance 932 from the desired track position. Using the distance measurement, the ROM table 936 is accessed to retrieve a target velocity for the arm and thus the head. Once the target velocity 934 has been found in the table, the difference 906 between the target velocity 934 and the actual velocity 928 of the head is found. Acceleration continues until the actual velocity 928 of the head nears the target velocity, or $v_{max}$, whichever is lower. As the distance 932 to the desired track decreases, the target velocity 934 will in turn decrease based on the square root equation. Deceleration begins when the target velocity 934 is lower than the actual velocity 928.

During deceleration, the control system 900 once again periodically gathers information regarding the actual velocity 928 of the head, and the head's distance 932 (again, measured along an arc centered about the arm's pivot) from the desired track position. Using the distance measurement 932, the ROM table 936 is accessed to retrieve the target velocity 934 of the head. As in the case of acceleration, calculating the velocity 934 in real time is too processor intensive and requires the table 936 to be used instead. Once the target velocity 934 has been found in the table 936, the difference 906 between the target velocity 934 and the actual velocity 928 of the head is found. If the velocity 928 of the head exceeds the target velocity 934, the servo system is fed with a current 920 that is proportional to the difference 906 between the head's actual 928 and target velocity 934, and a resulting torque will be applied to the actuator arm, decelerating the arm. Deceleration continues until the head comes to rest at the desired track position.

This conventional scheme requires referencing the look-up table stored in ROM 936 because calculating the target velocity 934 in terms of distance is a non-linear, processor intensive task when constant acceleration is being applied. If the control system was able to calculate a target velocity 934 in real time, then the expensive ROM space required for the look-up table would be considerably reduced in size.

SUMMARY OF THE INVENTION

The method and apparatus in accordance with the present invention solves the aforementioned problem and other problems of producing a disc drive with an optimal seek operation. The seek operation method begins by accelerating the actuator arm of the disc drive with maximum torque. Once the acceleration has begun, a distance from the current actuator position to the desired position is determined. This distance may be determined by comparing the current position with the desired position as indicated by the command received by the disc drive from the host computer. The optimum time required to seek from the current track over the obtained distance to the desired track is acquired. This time is determined by detecting that a servo sample period has elapsed and adding the servo sample period to an initial optimum time that if stored as a negative value or subtracted from the initial optimum time if stored as a positive value. The target velocity is found from the distance to the desired track and the optimum time to seek there. The target velocity can be generated from the optimum time to reach the target for the distance to the target by finding a first target velocity component. This component is computed by scaling a zero velocity acceleration by the optimum time. A second target velocity component is obtained by scaling the distance to the target track by the mechanical motor time constant. The target velocity is then found by comparing the second component to the first component. The velocity of the head may be obtained, and then compared to the target velocity to produce an error quantity. The error quantity is multiplied by a constant to produce an error value. The error value is then combined with a feedforward quantity and a proportional error current is produced which is fed into the voice coil motor attached to the actuator arm.

The seek operation apparatus includes a voice coil motor, which is used to apply torque to an actuator arm. A transducer is coupled to the actuator arm so that it produces a signal representative of the position of the head. A microprocessor is operably connected to the transducer and to the ROM possessing acceleration and motor time constants. The microprocessor generates the actual velocity of the actuator arm from the position signal, and utilizes the position signal and the command to determine the head's distance to the desired track. The stored initial optimum time and the elapsed servo sample period are used to calculate a remaining optimum seek time for each sample point. The target velocity is then computed by scaling the zero velocity acceleration constant by the optimum seek time and scaling the head's distance to the desired track by the mechanical motor time constant. The microprocessor compares the actual velocity with the target velocity to produce an error quantity. The error quantity is multiplied by a constant to produce an error value. The microprocessor then combines the error value with a feedforward signal to produce a current error value, and then converts the current error value into an analog signal, which a power amplifier receives. The power amplifier then magnifies the analog signal to drive the voice coil motor.

Determining the distance to the desired track and the optimum time to seek to the desired track at each velocity sampling time and then performing the target velocity calculation based upon those determined values enables the disc drive to eliminate the target velocity look up table which would otherwise occupy valuable ROM space.

These and various other features as well as advantages which characterize the present invention will be apparent from a reading of the following detailed description and a review of the associated drawings.

DETAILED DESCRIPTION

A disc drive contains many elements that cooperate to store data and provide it to a host computer when requested by a command. The actuator of a disc drive must be moved from one track to the next when a read or write command is received and the data to be read or written lies in a different track than where the actuator is currently positioned. A control system must receive the command and properly move the actuator arm. The control system is typically integrated into the disc drive electronics. To optimize the seek, the velocity of the actuator arm must be maximized from the time of initial acceleration until the actuator arm comes to rest. Control system embodiments of the present invention optimize the seek using linear velocity scheduling. By using linear determinations, the control system avoids using look-up tables and thereby saves costly ROM space. In a conventional disc drive, the target velocity is looked up after an actual velocity and position are measured. Using linear velocity scheduling, the actual velocity and position must be measured but the optimum time for the seek must also be counted down as the seek progresses. However, measurements of time are readily available to the control system. The seek optimization method embodiments utilize the position information and the command received from the host to linearly schedule the velocity rather than looking up the target velocity at each velocity sample time.

Figure 1:
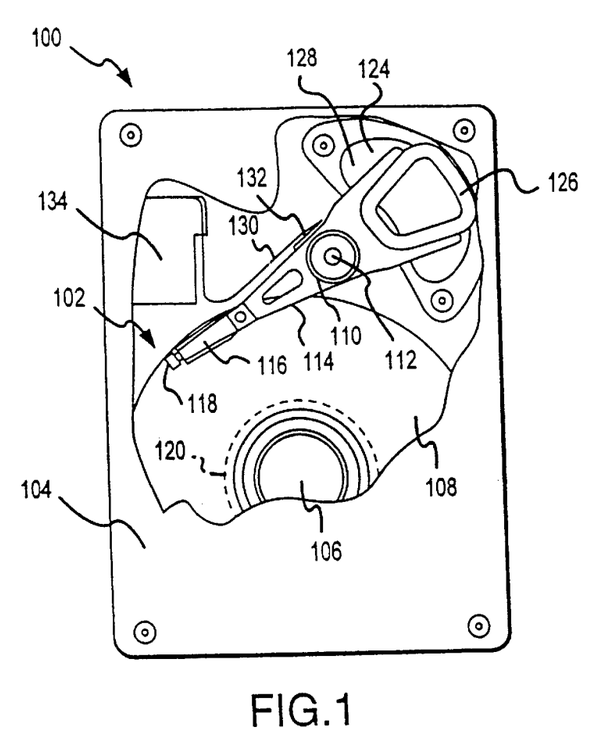
FIG. 1 is a schematic representation of a disc drive in which preferred embodiments of the invention operate.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
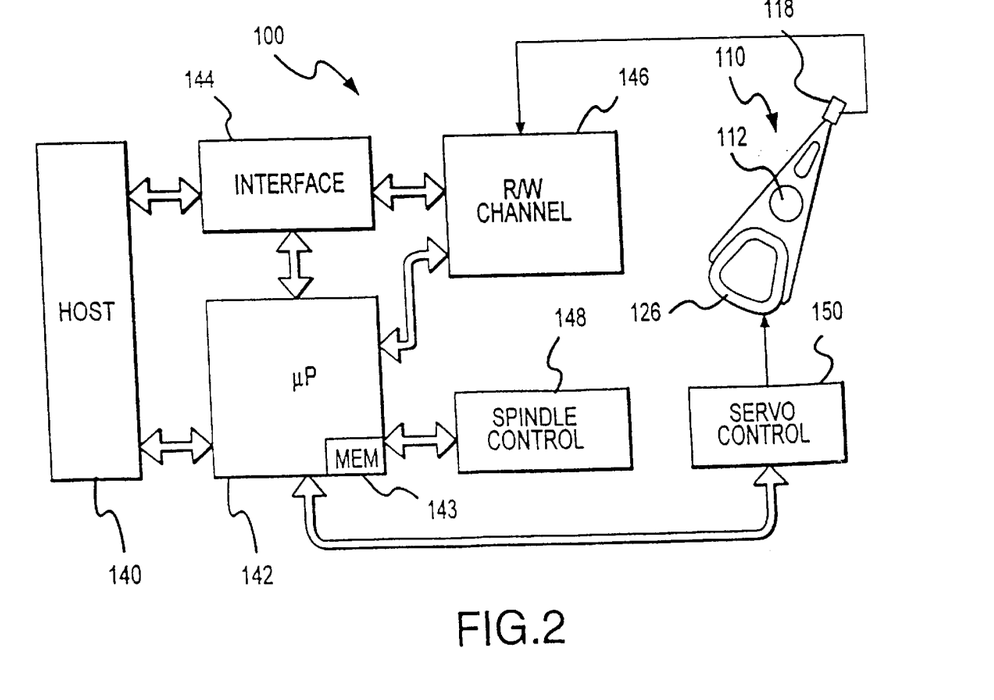
FIG. 2 illustrates a disc drive system connected to a host for the disc drive of FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. As will be shown in greater detail in FIG. 7, during a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor 126, thereby causing the actuator assembly 110 to be pivoted.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

Figure 3:
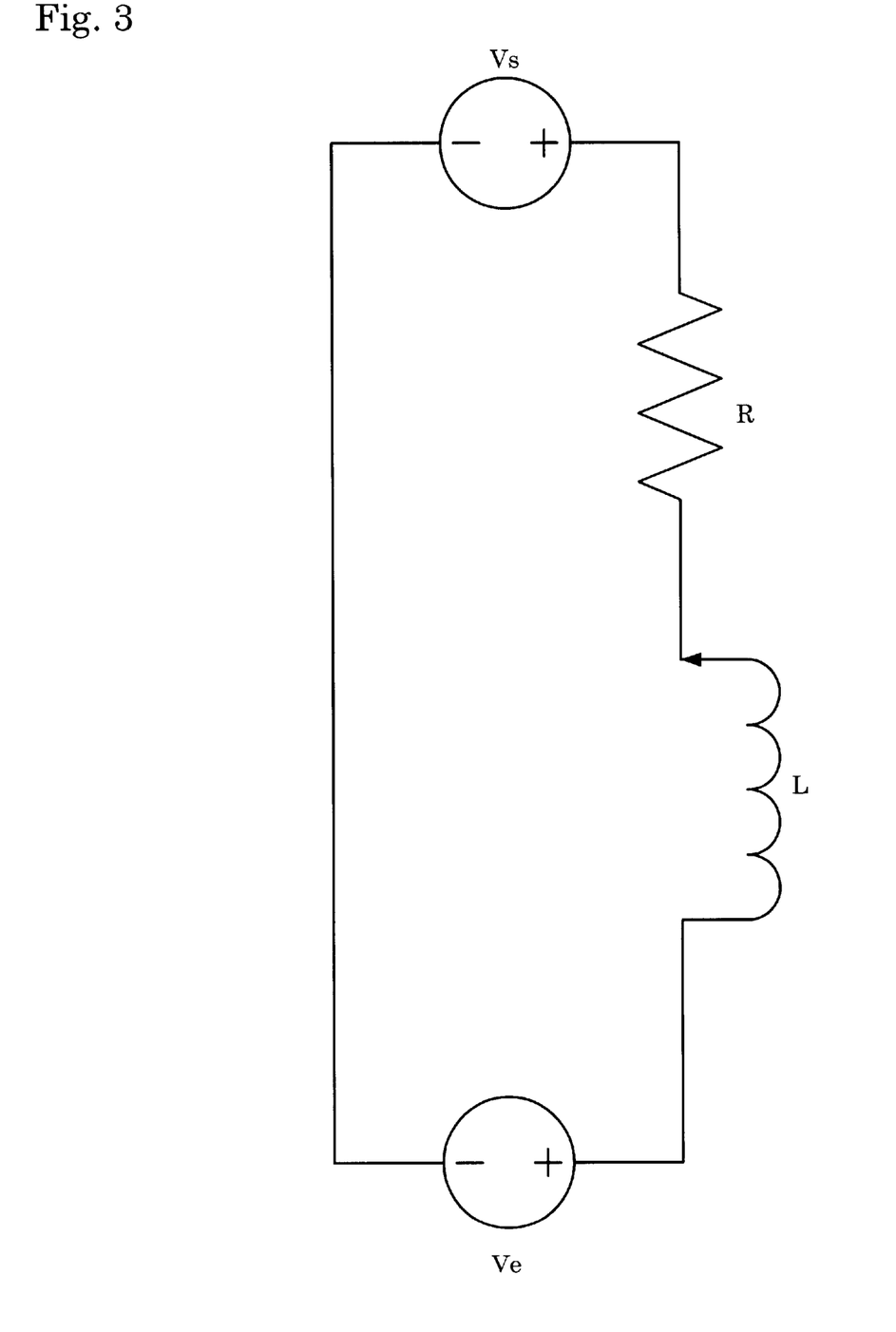
FIG. 3 illustrates a circuit diagram of a servomechanism in electrical connection with a voltage source.

FIG. 3 shows a circuit diagram for a servomechanism. The voltage source 160 driving the servo provides a voltage $V_s$ through the servo coil's resistance R and inductance L shown as a resistor 162 and inductor 164 connected in series. The electrical motor used in the servomechanism produces a back electromotive force (BEMF) voltage $V_e$ that is proportional to the motor's velocity. The BEMF opposes the supply voltage 160 that delivers current across the motor's coils when the motor is accelerating. The BEMF voltage is the product of the velocity of the motor w and the motor back emf constant $K_e$. As the motor begins to accelerate, full power supply voltage is available to the coils. As velocity builds, BEMF voltage also builds and the current i through the coils exponentially reduces with time. Under deceleration, the polarity of the power supply reverses to supply current in the opposite direction across the motor coils. The voltage due to BEMF does not change polarity in deceleration. Thus, the voltages become additive and extra current is available. This extra current provides deceleration above the zero velocity rate and utilizing the greater deceleration rate improves performance by reducing the seek time. As the velocity begins to decrease, the BEMF voltage available to provide extra current also begins to decrease. As zero velocity is approached, the voltage available to the coils approaches the supply voltage and the deceleration approaches the zero velocity rate. Under deceleration, the fall in current and deceleration rate are exponential.

The exponential acceleration and deceleration are given by the equation $a=a_o e^{-t/\tau}$, where $a_o$ represents the zero velocity acceleration which occurs at zero velocity when no BEMF exists, t represents the time the head must travel to reach the desired track, and $\tau$ represents the mechanical motor time constant which is known from the servomotor's parameters. See *D.C. Motor Speed Control Servo Systems*, Robbins & Myers/Electro-Craft, $5^{th}$ ed., page 2 –19, for a discussion of the mechanical motor time constant. Integrating the acceleration equation results in an equation for velocity, $w=a_o\tau(1-e^{-t/\tau})$. Integrating the velocity equation results in an equation for displacement $x=a_o\tau t-a_o\tau^2(1-e^{-t/\tau})$. If $\tau$ is factored out, then the result is $x=\tau(a_o t-a_o\tau(1-e^{-t/\tau}))$. By simple substitution, $x=\tau(a_o t-w)$. From this equation, it can be seen that $w=a_o t-x/\tau$. Velocity can now be found solving all linear equations. However, both time and distance to the desired track must be known. These quantities are readily available to the servo system, and the target acceleration and target velocity may be calculated in real time since there are no non-linear terms.

The derivation of the equations of motion that lead to the linear expression for velocity begins with an expression for the current that flows through the motor's coils. Examining FIG. 3, it can be seen that the equation for current in the Laplacian frequency domain is $I(s)=(V_s-K_e w)/(R+Ls)$, where $V_s$ is the power supply voltage in volts, $K_e$ is the motor back emf constant in volts per radians per second, w is the velocity of the motor, R is the resistance of the motor coils, L is the inductance of the motor coils, and s is the Laplacian frequency. Assuming that the Laplacian frequency s is much smaller than the R/L inductance pole, the Ls term drops out and the time domain result becomes $i(t)=V_s/R-K_e w/R$. The assumption is reasonable in this case because the frequencies of interest are very low as the supply voltage is DC.

Acceleration of a servomechanism is proportional to the current i through its coils 30 and is given by the equation $a=iK_t/J$, where a is the acceleration in meters per second squared, i is the current in Amperes, $K_t$ is the motor torque constant in Newton meters per Ampere, and J is the motor's moment of inertia in kilogram meters squared. Substituting the equation for current into the equation for acceleration yields $a=(K_t/(JR))(V_s-K_e w)$ which can be rewritten as $a=(K_t V_s)/(JR)-w(K_t K_e)/(JR)$. To find the zero velocity acceleration $a_o$, velocity is set to zero to eliminate the production of BEMF. The result is $a_o=(K_t V_s)/(JR)$. It is well known that $JR/(K_t K_e)=\tau$, the mechanical motor time constant in seconds. D.C. *Motor Speed Control Servo Systems*, Robbins & Myers/Electro-Craft, 5th ed., page 2–19. Substituting $a_o$ and $\tau$ into the equation for acceleration results in the equation $a(t)=a_o-w(t)/\tau$. Integrating to get velocity results in the useful equation $w(t)=a_o t-x(t)/\tau$.

Figure 4:
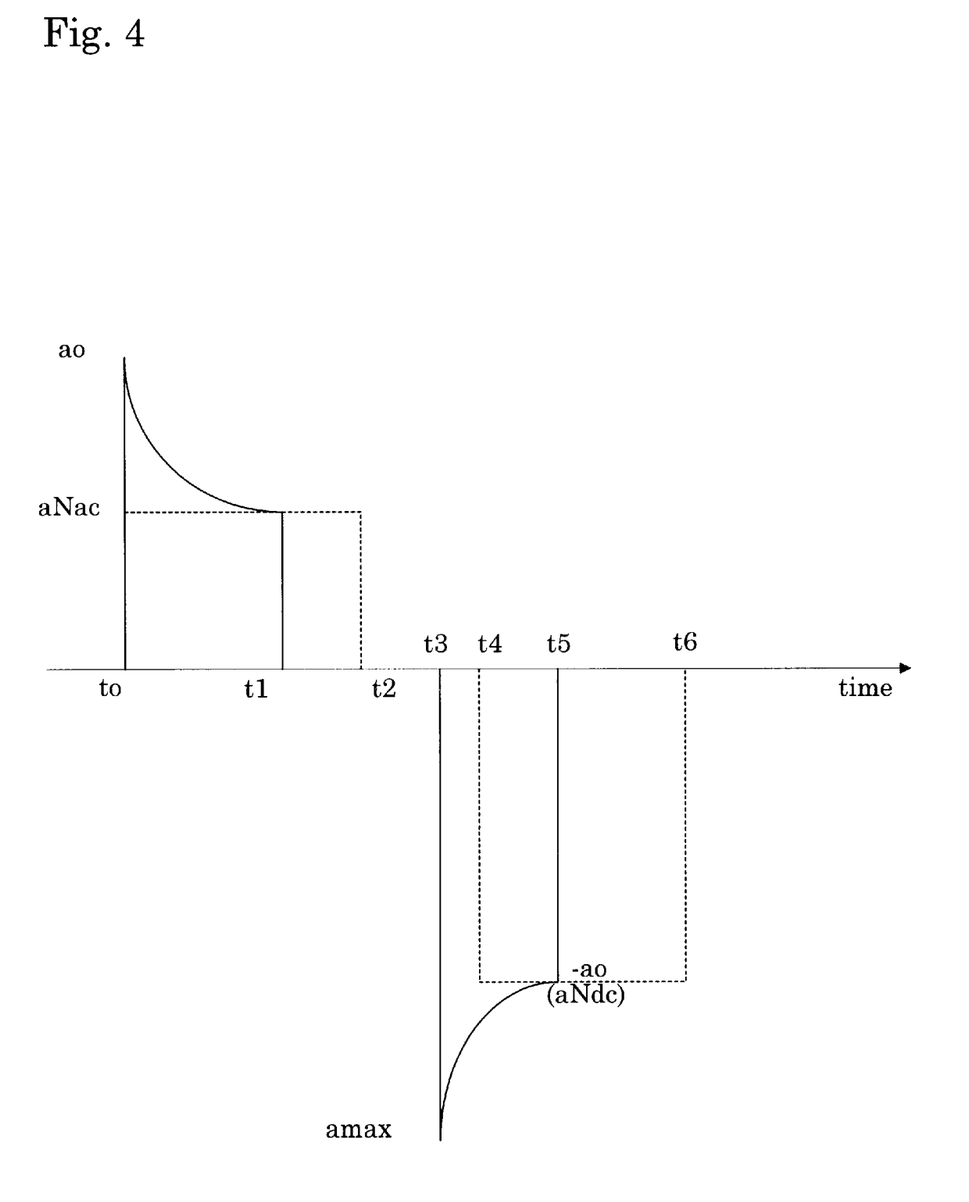
FIG. 4 illustrates an adapted exponential acceleration curve with a superimposed typical constant acceleration curve.

FIG. 4 depicts both the constant acceleration and deceleration pattern of the actuator arm during a seek operation shown as a dashed line and the exponential nature of the acceleration and deceleration when implementing BEMF shown as a solid line. During a seek operation, the actuator arm undergoes both a period of acceleration and a period of deceleration. The exponential acceleration pattern for an actuator arm has an acceleration period bounded by times $t_0$ and $t_1$, followed by a deceleration period bounded by times $t_3$ and $t_5$. At $t_0$ the acceleration begins at its zero velocity value, $a_o$, with no BEMF voltage yet being generated as the velocity is zero. The acceleration exponentially decreases as velocity and BEMF voltage begin to increase. At $t_1$ the acceleration period ends as the acceleration has approached a value $a_{Nac}$ typically used as the constant acceleration value in a typical system utilizing a look-up target velocity table. As can be seen, a system utilizing a constant acceleration $a_{Nac}$ does not fully implement the acceleration capabilities at low velocities and the resulting acceleration time extends to $t_2$.

Deceleration may utilize the BEMF to increase the initial acceleration rate to $a_{max}$. The zero velocity acceleration $a_o$, which is the maximum rate for acceleration, becomes the minimum rate for deceleration which also equals $a_{Ndc}$, the maximum when using constant deceleration. The deceleration begins at $t_3$ and the deceleration rate exponentially decreases due to the decreasing velocity and BEMF. The minimum deceleration is reached at $t_5$ as the velocity reaches zero. A system using constant acceleration begins the deceleration phase at a later time $t_4$ and ends as the velocity reaches zero at $t_6$. Utilizing the BEMF greatly reduces the total seek time. Additionally, the exponential nature of the acceleration permits the linear equations to be used to calculate target velocity in real time.

Figure 5:
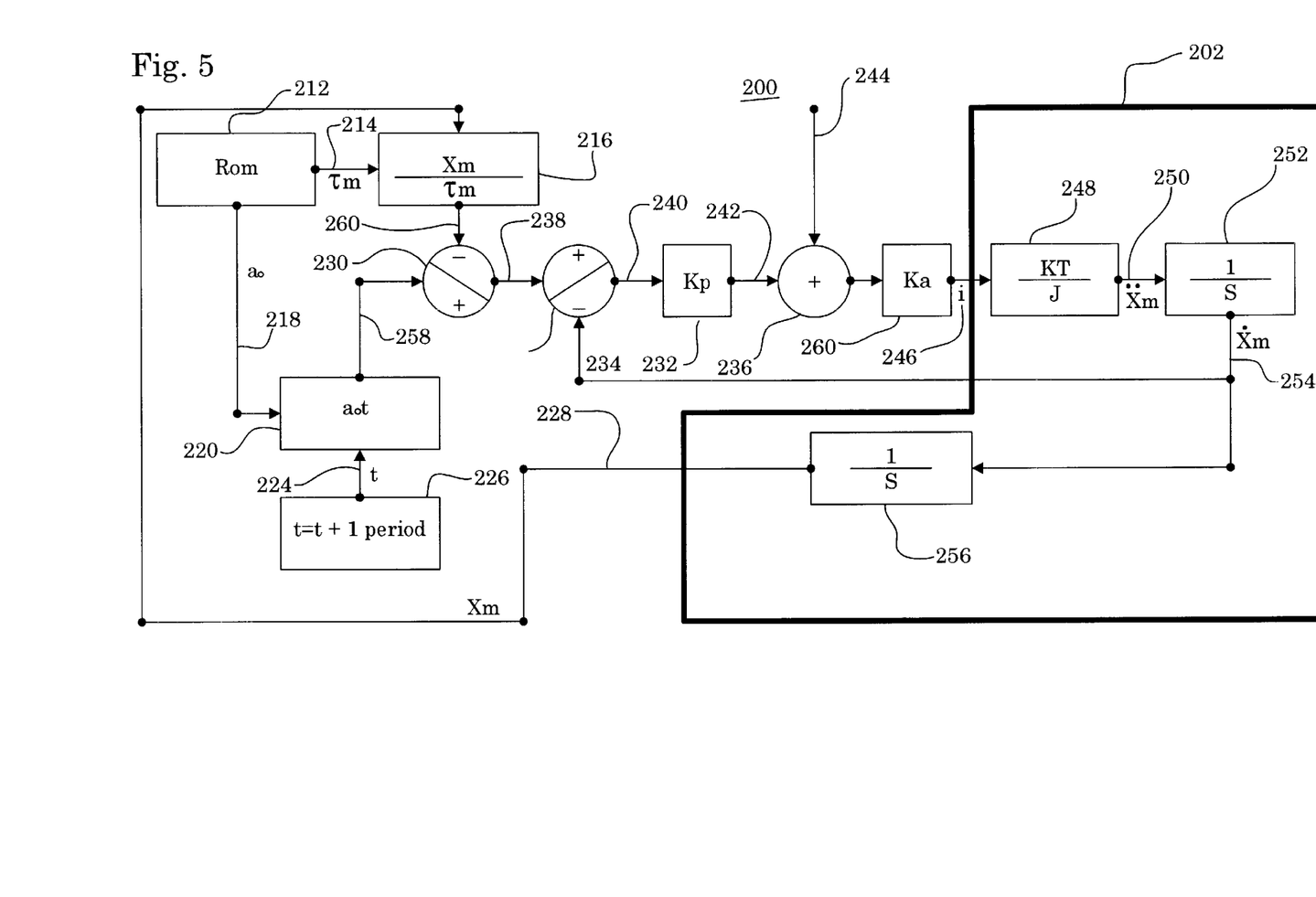
FIG. 5 is a signal flow diagram of a servo control system in accordance with the present invention.

FIG. 5 is a signal flow diagram of a control system 200 in accordance with the present invention. The voice coil motor 202 in FIG. 4 is driven by a current 246 which results in acceleration 250 from the interaction of motor constants 248, and a velocity detector in the servo returns a velocity signal 254 from integrating process 252 and a distance detector in the servo returns a position signal 228 from integrating process 256. Ideally, as mentioned, the driving current 246 is proportional to the acceleration 250 of the actuator arm attached to the voice coil motor 202. The velocity signal 254 represents the actual velocity of the voice coil motor 202, and the position signal 228 represents the distance of the head from its desired track location.

The system generates the target velocity in real time with a target solver consisting of a first component determination process 220, a second component determination process 216, and a summation process 230. The position signal 228 which is returned from the voice coil motor 202 is utilized in finding the target velocity as well. In one embodiment, a time value detector initiating a time to target determination process 226 stores a negative time value equal to the time needed to seek to the target. A servo sample period is known since the disc spins at a constant angular velocity. At each servo sample period, the target determination process 226 adds a known servo sample period to the time remaining, if expressed as a negative value, or subtracts the known period if the time remaining is expressed as a positive value. Each time a servo sample period is added, the time to target value increases if a negative convention is used or decreases if a positive convention is used. Regardless of convention, the time remaining, which is sampled at each burst period, gets closer to zero at each subsequent sample. The resulting time to target 224 is fed into a first component determination process 220. Process 220 receives the zero velocity acceleration value 218 from ROM 212 and scales it by the time to target to generate a first component to the target velocity 258.

The position signal 228 is also fed into a second component determination process 216 in determining the target velocity. The mechanical motor time constant $\tau$ 214 is fed from ROM 212 to the second component determination process 216 which scales the distance to the target position signal 228 by $\tau$ 214 to produce a second component of the target velocity 260.

The second component 258 is compared to the first component 260 in a comparator initiating summation process 230. The resulting quantity is the target velocity 238 which is fed into summation process 232. The actual velocity 254 of the actuator arm attached to the voice coil motor 202 is also fed into the comparator initiating summation process 232 and is deducted from the target velocity 238 to yield an error signal 240. The error signal is then fed into a compensator initiating a scaling process 234 where it is amplified to produce an error value 242. The scaling stage 234 ensures control system stability. The error value 242 is fed into a combiner initiating a summation process 236 together with a feedforward deceleration signal 244 that is proportional to $a_o-w(t)/\tau$.

The feedforward deceleration signal 244 combined with the error value 242 is scaled by amplification stage 260 to produce the error current 246 which drives the servomechanism 202. The use of the feedforward deceleration signal to produce the error current 246 ensures smaller error signals 240, with the concomitant effect of shorter settling times.

Figure 6:
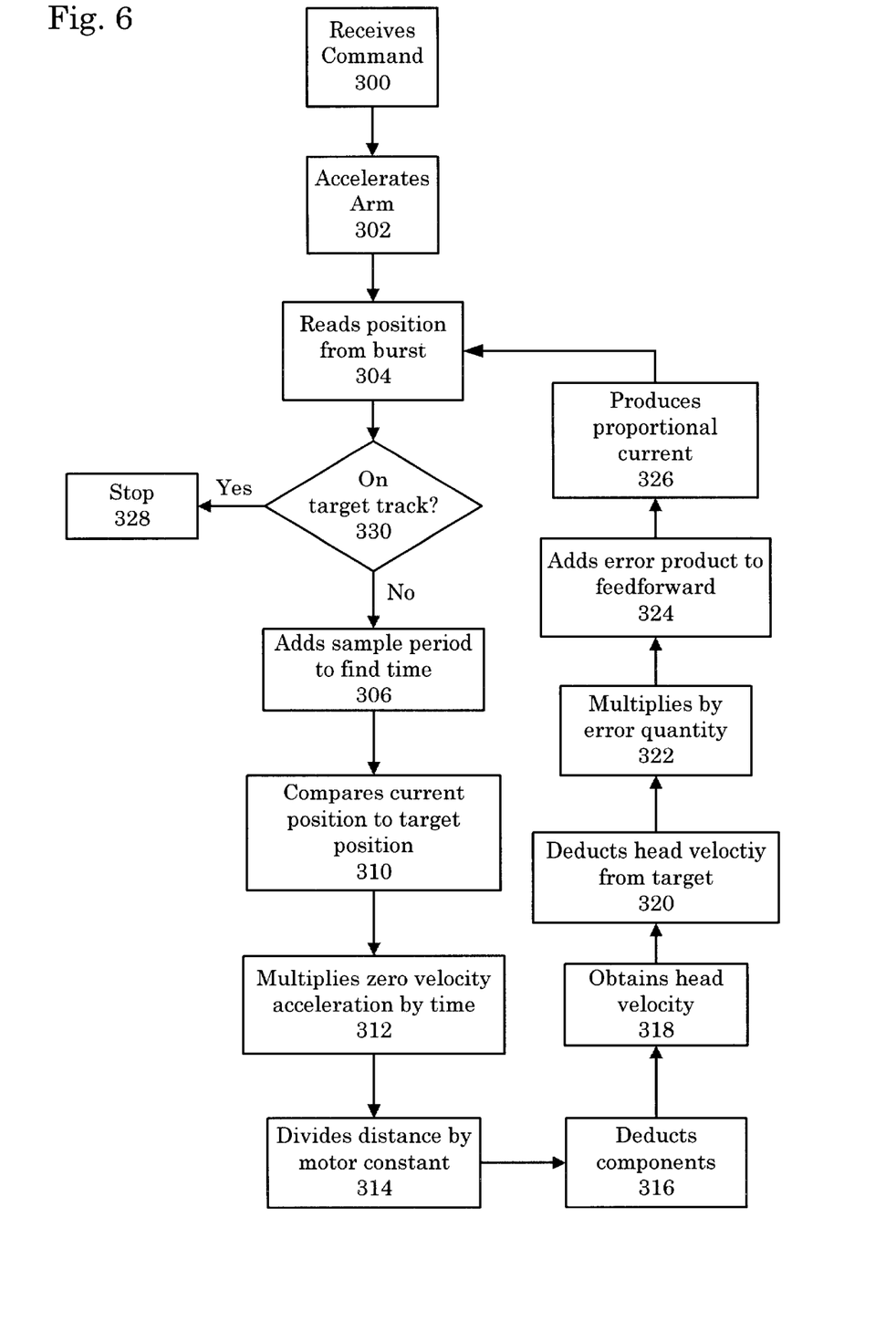
FIG. 6 is an operation flow diagram of an embodiment of the present invention operating in the disc drive system of FIG. 2, and more particularly the control system of FIG. 7.

One particular method of controlling the servomechanism in accordance with the present invention is shown in FIG. 6. Receive command operation 300 converts a requested target data location into a seek process. Accelerate arm operation 302 provides current to the voice coil motor to accelerate the actuator arm with maximum torque.

Control then transfers to read position operation 304, in which the head's distance from the desired track location is obtained. In one embodiment, the position is obtained by reading servo burst information recorded on the disc at each servo sample period which is the time a servo burst passes by the actuator arm. The servo burst information may be compared with the information in the command to determine the head's distance to the desired track, as will be discussed with respect to operation 310.

Query operation 330 tests whether the head has found the target track by detecting whether the head's distance to the desired track, as determined in step 304, has reached zero. If the desired track has been reached, then stop operation 328 halts the seek process.

Time operation 306 produces the current optimum time remaining for the seek to the desired track. This value is produced at each servo sample period. In one embodiment, the initial value which is expressed as a negative time value is stored. Once the seek begins, a timer periodically reaches each servo sample period, and the period value is added to the negative number to represent the current optimum time remaining for the seek. This value is determined at precisely the same time the servo burst information was read in step 304.

At Distance operation 310, the distance remaining in the seek to the desired track is found by comparing the burst position information read at step 304 with the burst position information contained in the command.

First velocity component operation 312 determines the first component to the target velocity by scaling the known zero velocity acceleration, $a_o$ by the optimum time remaining determined in step 306.

Second velocity component operation 314 determines the second component to the target velocity by scaling the head's distance to the desired track, determined in step 310, by the known mechanical motor time constant $\tau$.

Target velocity operation 316 compares the second component to the target velocity determined in step 314 with the first component determined in step 312. The result of step 316 is the target velocity.

Head velocity operation 318 determines the actual velocity of the actuator arm assembly carrying the head. The velocity of the head may be obtained in a number of manners. For example, the velocity of the head may be arrived at by subtracting consecutive position measurements and dividing the difference by the corresponding time interval. Calculating the velocity in this manner would require an initial position measurement before the process of calculating the target velocity is started, so that each subsequent position measurement results in an actual velocity being determined. Also, the velocity of the head may be directly measured by methods known in the art.

Error quantity operation 320 determines the error quantity by comparing the actual velocity determined at step 318 from the target velocity calculated at step 316. The error quantity is then sent to the Error scaling operation 322 where the error quantity is scaled to produce an error value that ensures the stability of the control system.

Error current operation 324 combines the error value calculated in step 322 with a feedforward deceleration signal to yield an error current value. Proportional error current operation 326 then generates a current proportional to the error current value determined in step 324 through the voice coil motor which give the actuator arm an acceleration proportional to the current. Control then proceeds back to the Reads position operation 304 to determine the next sector burst information.

Figure 7:
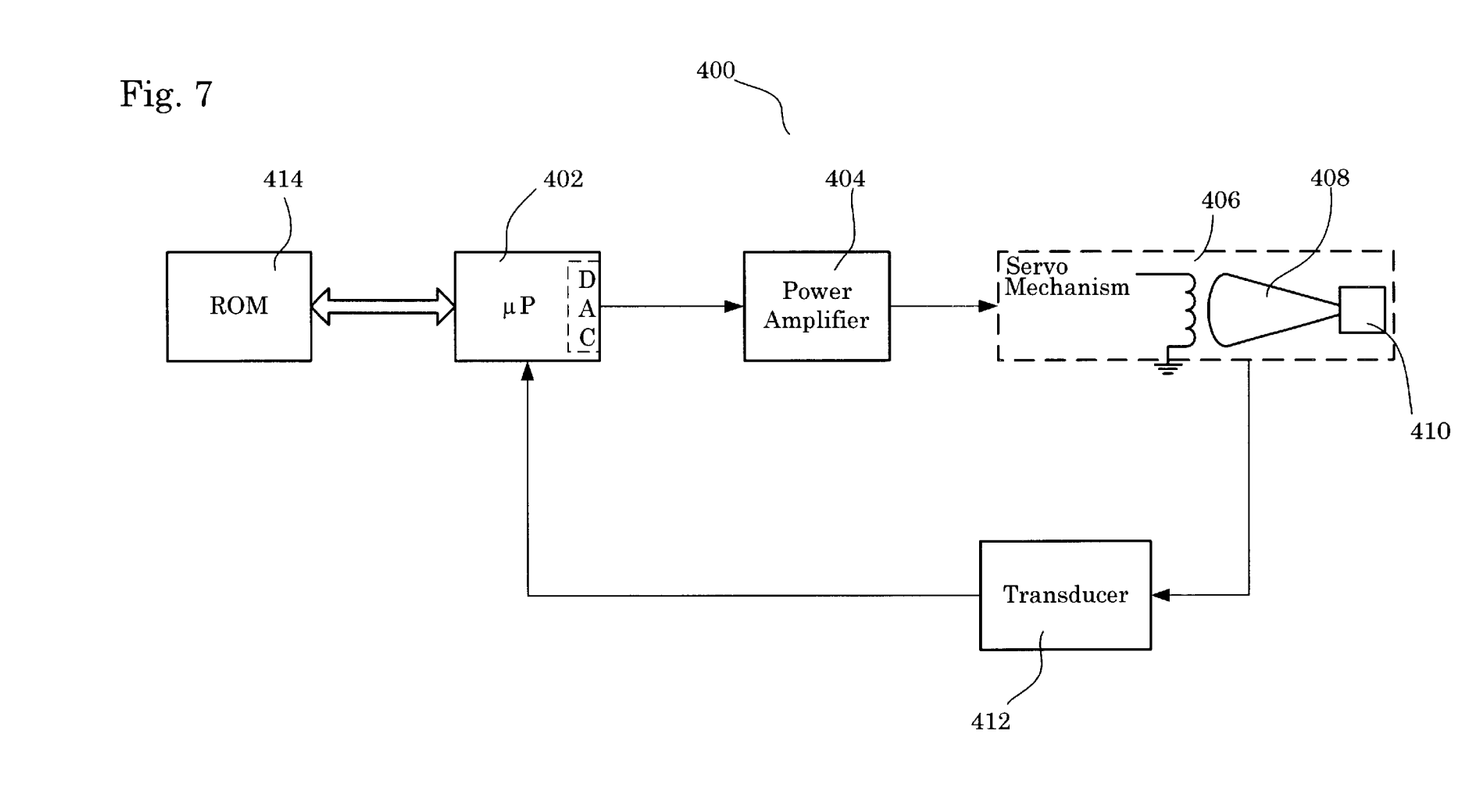
FIG. 7 illustrates a control system in accordance with the present invention.

FIG. 7 illustrates a block diagram of a control system in accordance with the present invention. Within the control system 400, a voice coil motor 406 is used to apply torque to an actuator arm 408. A transducer 412 is coupled to the voice coil motor 406 so that it produces a signal representative of the position of the head 410. A microprocessor 402 is operably connected to the transducer 412 and to a ROM 414 which in one embodiment contains, for each potential seek, the optimum time required for the seek. The microprocessor 402 calculates the actual velocity of the actuator arm 408 from the position signal received at each servo sample period, and utilizes the position signal, the current command, and known constants for the zero velocity acceleration, mechanical motor time constant, and servo burst period to generate a target velocity. Then, the microprocessor 402 compares the actual velocity with the target velocity to produce an error quantity, scales the error quantity by a constant to produce an error value, and combines the error value to a feedforward signal. The microprocessor 402 then converts the combination into an analog signal, which a power amplifier 404 receives, and magnifies so as to drive the voice coil motor 406.

To summarize exemplary embodiments of the present invention, a method for calculating a target velocity for a head in a disc drive in real time can be realized by executing the following steps in a control system. The actuator arm is accelerated with maximum torque available due to the interaction of a supply voltage and a back emf generated by the servomechanism, as in operation 302. Next, the actual distance of the head to the desired track is obtained as in operation 310. This is typically done by comparing the present position of the actuator arm assembly as provided by the current servo burst as in operation 304 to the desired position of the actuator arm assembly as provided by the command. The optimum time required to seek the head from the current track to the desired track over the obtained distance is determined. In one embodiment, this time is obtained detecting that a servo sample period has elapsed and by combining the servo sample period to a stored initial optimum time value.

The target velocity can be computed from the obtained distance to the target and the obtained optimum time required to seek over that distance. A first component is found by scaling the zero velocity acceleration constant by the time to the target as in operation 312. Then, a second component is found by scaling the head's distance to the target by the mechanical motor time constant as in operation 314. The target velocity is then found by comparing the second component to the first component as in operation 316.

The actual velocity of the head is obtained by known methods as in operation 318 and the actual velocity is then compared to the target velocity to yield an error quantity as in operation 320. An error product is then found by scaling the error quantity by a constant to produce an error product which ensures the system's stability, as in operation 322. The error product is combined with a feedforward quantity as in operation 324 and a current proportional to the sum is fed into the servomechanism as in operation 326. The position of the actuator arm assembly is then read again, such as in operation 304 and the loop continues until the head comes to rest at the desired track.

In a control system such as 200, a servomechanism is used to apply torque to an actuator arm. The servomechanism may be a torque motor 406. A transducer 412 is coupled to the servomechanism so that it produces a signal representative of the position of the head 410. A microprocessor 402 is operably connected to the transducer 412 and to a ROM possessing zero velocity acceleration and motor time constants. The microprocessor 402 finds the actual velocity of the actuator arm from the position signal, and utilizes the position signal and the command to determine the head's distance to the desired track. The optimum time remaining for the seek is determined by combining the number of servo sample periods that have elapsed during the seek to a stored initial optimum time known for the current seek. The acceleration constant is then scaled by the optimum time to produce a first component and the distance to the desired track is scaled by the motor time constant to produce a second component. The second component is compared to the first component to produce a target velocity. The microprocessor 402 then compares the actual velocity with the target velocity to produce an error quantity. The error quantity is scaled by a constant to produce an error product, and the error product is combined with a feedforward signal. The microprocessor 402 then converts the sum into an analog signal, which a power amplifier 404 receives and magnifies so as to drive the servomechanism.

It will be clear that the present invention is well adapted to attain the ends and advantages mentioned as well as those inherent therein. While a presently preferred embodiment

What is claimed is:

1. A method for controlling the track seek of a head on an actuator arm driven by a servomechanism in a disc drive by generating a target velocity for the head in real time, comprising steps of:
   a) accelerating the actuator arm with maximum torque available due to an interaction of a supply voltage and a back emf (electromotive force) generated by the servomechansism;
   b) measuring an obtained distance indicating an actual distance of the head to a desired track;
   c) acquiring an obtained time value indicating an optimum time required to seek to the desired track over the obtained distance;
   d) generating in real time a target velocity from the obtained distance and the obtained time value; and
   e) correcting a velocity of the head in accordance with the target velocity.

2. The method of claim 1 wherein step d) comprises:
   d)(i) scaling a known zero velocity acceleration for the actuator arm by the obtained time value to determine a first target velocity component;
   d)(ii) scaling the obtained distance by a known mechanical motor time constant for a servomechanism attached to the actuator arm to determine a second velocity component; and
   d)(iii) comparing the second velocity component of step d)(ii) to the first velocity component of step d)(i) to determine the target velocity.

3. The method of claim 1 wherein an initial optimum time for the seek is stored as a value in a memory in a disc drive and wherein the step c) comprises:
   c)(i) detecting that a servo sample period has elapsed; and
   c)(ii) finding the optimum time remaining for the seek by combining a number of servo sample periods that have elapsed during the seek to the initial optimum time.

4. The method of claim 1 wherein position information for a final servo sample located in the desired track is provided in a command sent to a disc drive and wherein step b) comprises
   b)(i) reading an intermediate servo sample with the head to get position information; and
   b)(ii) comparing the position information of the intermediate servo sample with the position information of the final servo sample to obtain an actual distance to the desired track.

5. A control system for an actuator arm in a disc drive that calculates a target velocity in real time, comprising:
   a voice coil motor that applies torque to the actuator arm;
   a transducer operably connected to a servomechanism containing the actuator arm so that the transducer produces a signal representative of the position of the actuator arm by reading servo bursts;
   a memory possessing acceleration and motor time constants;
   a microprocessor operably connected to the transducer and the memory, that calculates the actual velocity of the actuator arm from the position signal, that uses the position signal and a command signal to determine a distance of the actuator arm to the desired track, that uses a stored initial optimum time for a seek and a number of servo burst periods that have elapsed to calculate an optimum time to seek to the desired track, that finds the target velocity by comparing the acceleration constant scaled by the optimum time to the distance to the desired track scaled by the motor time constant, that compares the actual velocity from the target velocity to produce an error quantity, that multiplies the error quantity by a constant to produce an error value, that combines the error value with a feedforward signal to produce an error current value, and that converts the error current value into an analog signal; and
   a power amplifier operably connected to the microprocessor and the servomechanism, that receives the analog signal and magnifies it to drive the servomechanism.

6. The control system of claim 5 wherein the microprocessor scales the time value by the acceleration constant for the actuator arm to produce a first velocity component, scales the distance to the desired track by the motor time constant to produce a second velocity component, and subtracts the second velocity component from the first velocity component to produce a target velocity.

7. The control system of claim 5 wherein the initial optimum time for the seek is a value stored in a memory in a disc drive and the microprocessor generates the time value by combining the number of servo sample periods that have elapsed during the seek to the initial optimum time for the seek.

8. The control system of claim 5 wherein position information for a final servo sample located in the desired track is provided in a command to a disc drive and wherein the microprocessor is configured to
   analyze an intermediate servo sample read by the head to get position information; and
   compare the position information of the intermediate servo sample with the position information of the final servo sample to obtain an actual distance to the desired track.

9. A method for controlling velocity of a moveable arm comprising steps of:
   accelerating the moveable arm with a maximum force available;
   determining an obtained distance indicating an actual distance to a desired position for the moveable arm;
   acquiring an obtained time value indicating an optimum time to seek to the desired position over the obtained distance;
   generating a target velocity from the obtained distance and the obtained time value; and
   correcting a velocity of the moveable arm in accordance with the target velocity.

10. The method of claim 9 wherein the generating step is done in real time.

11. The method of claim 9 wherein the accelerating step is based on an interaction of a supply voltage and a back emf (electromotive force) generated by a servomechanism.

12. The method of claim 9 wherein the obtained distance indicates the actual distance of a head to the desired position.

13. The method of claim 9 wherein the velocity that is corrected is a velocity of a head.

14. The method of claim 9 wherein the moveable arm is an actuator.

15. The method of claim 9 wherein the maximum force is a torque.

* * * * *